Sept. 20, 1966  E. J. ZAHURANEC ET AL  3,273,742
END CLOSURE ASSEMBLY
Filed June 2, 1964
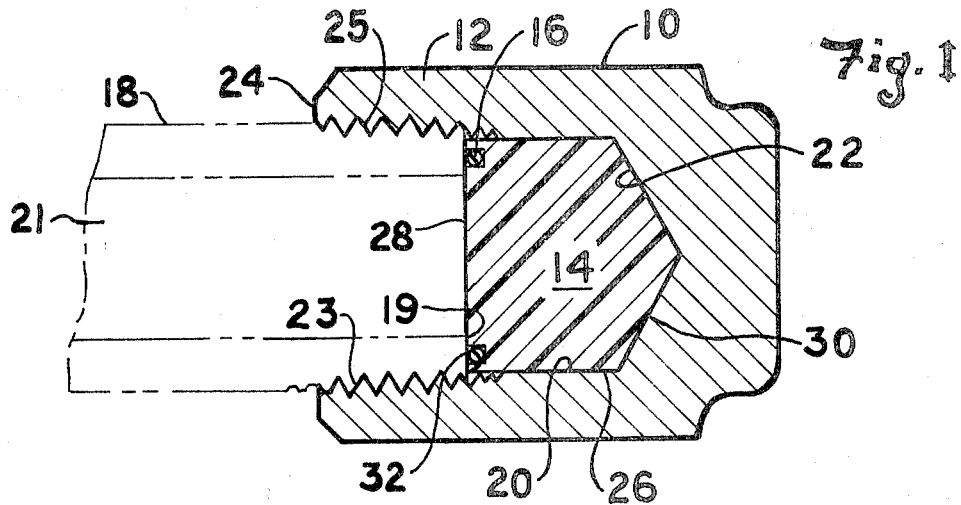
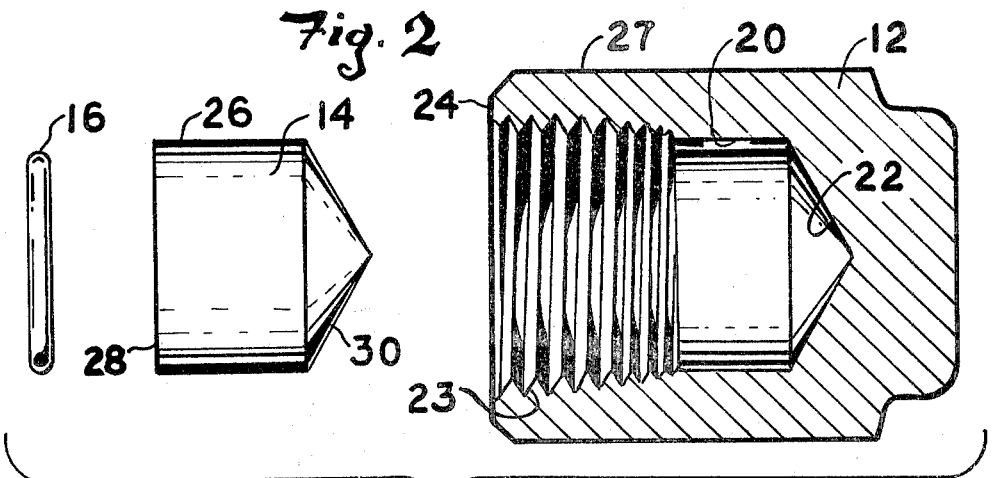
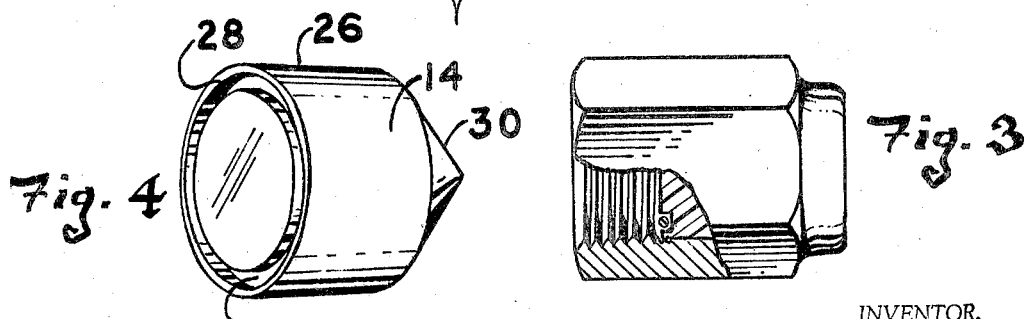
INVENTOR.
EMERY J. ZAHURANEC
ZOLTAN SZOHATZKY
BY Fay & Fay
ATTORNEYS United States Patent Office 3,273,742
Patented Sept. 20, 1966

3,273,742
END CLOSURE ASSEMBLY
Emery J. Zahuranec, Bedford, and Zoltan Szohatzky, Cleveland, Ohio, assignors to Crawford Fitting Company, Cleveland, Ohio, a corporation of Ohio
Filed June 2, 1964, Ser. No. 372,015
7 Claims. (Cl. 220—39)

This invention concerns an end closure assembly for sealing the open ends of conduits.

In its broadest sense, the device comprises a cap having a generally cylindrical cavity terminating internally of the cap with an end wall. A generally cylindrical plug has a shape that is complementary with the shape of the cavity in the cap and is received slidably and snugly inside the cap. A suitable sealing means is received in a sealing cavity in one end of the plug to effect an adequate seal when the end closure assembly is operatively connected to a mating member, such as a fluid conduit.

Suitable means, such as threads, at the open end portion of the cap cavity, is used to advance and tighten the end closure assembly onto its mating member. As the end closure assembly advances on the mating member, a radial sealing surface at the end of the mating member contacts and squeezes the sealing means effecting an efficient seal.

The advantages of this device, generally, are that it provides an economical, efficient and easy means of sealing the end of a fluid-carrying conduit.

Those familiar with the prior art know that it is frequently desired to disconnect a pressure fluid line temporarily. For example, a fluid power component in a given system may have to be removed for repair, servicing or replacement, yet the overall fluid system may remain operative if the fluid lines to which the faulty component is connected are blocked.

In the past, end closure arrangements have been inadequate and unsatisfactory. Such arrangements have usually comprised a fitting assembly requiring some sealing compound or dope to effect the fluid seal. The use of such sealing means is not particularly desirable for a number of reasons. The use of an insufficient amount of sealing dope may cause fluid leakage. Even where sufficient dope is used, it may prove inadequate to effect sealing at high pressures. Excess dope may get into the fluid system, plug up some components, and cause them to malfunction or fail. Where sealing is inefficient or inadequate, the effects on the entire system may be disastrous. For instance, if enough fluid leaks out of the system, major, expensive components may be temporarily or permanently damaged.

Leakage may also result in many unsatisfactory, even dangerous, conditions, such as slippery areas which may cause injury to personnel. Leakage may also create fire hazards where the fluid used in a system is flammable. Where fire-resistant fluids are used to circumvent the hazards of fires, the loss of fluid through leakage is particularly expensive because of the high cost of fire resistant fluids. In many installations, loss of fluid may run at economically prohibitive levels if leakage problems exist.

It is thus obvious that there is a compelling need for an effective, adequate end closure assembly which can be obtained economically and used easily and efficiently.

With the foregoing problems in mind, it is a general object of the invention to provide an improved end closure assembly for sealing the open ends of conduits.

More particularly, it is an object of the invention to provide an end closure assembly which, when co-operatively joined with the mating fluid conductive member, will seal the mating member and prevent fluid under pressure from leaking through the end of the mating member.

It is a more specific object of this invention to provide an economical end closure which will seal the open end of a fluid carrying mating member efficiently and effectively.

It is another object of the invention to provide an end closure that comprises a minimum number of parts and which can be made inexpensively by a common manufacturing process.

It is another object of this invention to provide a versatile end closure adapted, by omission of certain components, for use as a conventional conduit cap.

It is still another object of this invention to provide an economical end closure that has good sealing characteristics when using finger-tight pressure to connect the end closure to the conduit it seals.

It is another object of this invention to provide a simple, effective end closure which is wholly self-contained and does not require a sealing compound or dope as, for instance, a paste or tape, to effect the fluid seal.

It is still another object of the invention to provide an end closure which can be assembled to a mating conduit easily and cleanly with low torque wrenching requirements, the end closure including means to grip the conduit tightly to prevent separation of conduit and end closure.

It is still another object of this invention to provide a non-complex end closure with readily removable parts, any of which can easily be replaced if damaged.

It is still another object of this invention to provide an end closure with a removable plug made, in a preferred embodiment, of a self-lubricating material, such as polytetrafluoroethylene, which will tend to remain immobile while the cap is being advanced onto the conduit. In this manner the sealing means of the end closure assembly tends to remain stationary and does not exhibit a tendency to be damaged during assembly.

Other and more specific objects of the invention will be apparent from the detailed description to follow.

In the drawings:

FIG. 1 is a fragmentary, longitudinal sectional view of an end closure embodying the invention, a conduit being fragmentarily shown in hidden outline;

FIG. 2 is an exploded view, partly in section, of the component parts of the closure assembly;

FIG. 3 is a perspective view of a plug member which forms a component of the end closure assembly; and FIG. 4 is a side elevational view of the end closure in reduced scale and partly in section.

Referring to FIG. 1, an end closure assembly 10 is shown which embodies the essential principles of the invention. The end closure assembly 10 comprises a cap member 12, a plug member 14, and suitable sealing means 16, disposed about the terminal end of a generally cylindrical conduit 18, shown in hidden outline. The end of the cylindrical conduit terminates in threads 25 and a radial sealing face 19 transverse to the axis of the conduit 18.

The cap member 12 has an axially disposed, generally cylindrical cavity. Threads 23 start at the open end of the cavity in plug 12 and extend inwardly until they terminate with a generally cylindrical, unthreaded bore portion 20 of the cavity. The inside diameter of bore 20 is smaller than that of the threads 23. The cylindrical cavity 20 terminates internally of the cap with a generaly conical end wall 22.

The open end of the cap has a radial face 24 disposed transversely to the axis of the cap 12. The outside of the cap 12 has suitable means for advancing it along the threads 25 of the mating member 18. In the illustrated embodiment, the cap 12 includes tool pads 27 for advancing the cap, using conventional tools. However, any form of tightening means, such as, for instance, knurling, may be employed to advance the cap member 12 along the threads of the mating member 18.

The plug member 14 has a generally cylindrical body 26 which is complementary with and received snugly and slidably into the cylindrical cavity 20 of the cap 12. At one end, the plug 14 has a radially extending surface 28 which is generally transverse and normal to the axis of the plug and complementary with the radial sealing face 19 of the mating member 18. The surface 28 has a sealing cavity 32 opposed to the radial sealing face 19 of the mating member 18 when the end closure assembly 10 is operatively connected with mating member 18. The opposite end of the plug 14 terminates in a generally conical surface 30 that is complementary with the configuration of the end wall 22 in the cap 12. The plug member 14 can be made of a resinous, resilient material such as polytetrafluoroethylene. However, and depending on the application, the plug may be made of any number of other materials, such as metal, for example.

Suitable sealing means 16, such as an elastomeric O-ring, for example, is received in the sealing cavity 32 of plug 14. Depending, again, on the application, sealing means 16 also may be made of other materials, such as a suitable metal. When positioned in groove 32, but in its undeformed state, sealing means 16 extends axially slightly beyond the surface 28 of the plug 14 as shown in FIGS. 1 and 4. When the end closure assembly 10 is operatively associated with the mating conduit 18, the sealing means 16 is squeezed. The depth of the sealing cavity 32 is adequate to provide controlled squeeze on the sealing means 16 providing an effective fluid seal between the sealing face 19 of the mating conduit and the surface 28 of the plug 14.

For ease of description, the principles of the invention have been set forth in connection with but a single illustrated embodiment, showing a cap with female threads and a generally cylindrical plug received within a generally cylindrical cavity in the cap. It is not our intention that the illustrated embodiment, nor the terminology employed in describing it, be limiting, inasmuch as variations in these may be made without departing from the spirit of the invention. Rather, we desire to be restricted only by the scope of the appended claims.

We claim:

1. An end closure assembly for a threaded mating member having an axial fluid passageway therein and a radial end sealing face transverse to the axis of the passageway, comprising a cap member having thread means for engagement with the threaded mating member, said cap member having means for advancing the cap member along the threads of the mating member, said cap member further having a generally cylindrical cavity concentric with said thread means and having a closed inner end wall, a generally cylindrical plug member separate from said cap member and snugly and slidably received in said cavity, said plug member having an inner end surface substantially complementary with said closed inner end wall of said cap member, said closed inner end wall including inclined wall means to center the axis of said plug member relative to the axis of said cap member, the outer end of said plug member having a radially extending surface generally complementary with the sealing face of the mating member and recessed to define a sealing cavity opposed to the sealing face of the mating member when the end closure assembly is operatively connected with the mating member, sealing means received within the sealing cavity and, in the undeformed state, extending axially slightly beyond said radially extending surface of the plug, thereby providing adequate seal compression and effecting a proper fluid seal between the sealing face of the mating member and the radially extending surface of the plug when the end closure assembly is operatively associated with the mating member.

2. The end closure assembly of claim 1, wherein the sealing cavity in the surface of the plug member is an annular groove.

3. The end closure assembly of claim 1, wherein the sealing member is of elastomer.

4. The end closure assembly of claim 1, wherein the end wall in the cap member and the complementary surface of the plug are generally tapered.

5. An end closure assembly for a threaded mating member having an axial fluid passageway therein, said member having a radial end sealing face transverse the axis of the passageway, such assembly comprising a cap member having an axially disposed, generally cylindrical cavity terminating internally of the cap with a closed end wall, the open end of said cap having thread means concentric with the axial cavity adapted to co-operate with the threads of the mating member, the cap having means for advancing the cap along the threads of the mating member, said assembly further comprising a plug member snugly and slidably received within said cap, the end wall in said cap including means to center the axis of the plug member relative to the axis of the cap, said plug member comprising a generally cylindrical body portion complementary with the cylindrical cavity in the cap, the plug body portion having at one end portion thereof a radially extending surface generally complementary with the sealing face of the mating member, the other end of the plug body portion terminating in a surface generally complementary with the end wall within the cap member, said radially extending surface of said plug being interrupted and forming a sealing cavity concentric with the body portion of said plug and being opposed to the sealing face of the mating member when the end closure assembly is operatively connected with the mating member, sealing means received within the sealing cavity and, in the undeformed state, extending axially slightly beyond said radially extending surface of the plug, thereby providing adequate seal compression and effecting a proper fluid seal between the sealing face of the mating member and the radially extending surface of the plug when the end closure assembly is operatively associated with the mating member, the plug member being of resilient, resinous material.

6. An end closure assembly for a threaded mating member having an axial fluid passageway therein, said member having a radial end sealing face transverse the axis of the passageway, such assembly comprising a cap member having an axially disposed, generally cylindrical cavity terminating internally of the cap with a closed end wall, the open end of said cap having thread means concentric with the axial cavity adapted to co-operate with the threads of the mating member, the cap having means for advancing the cap along the threads of the mating member, said assembly further comprising a plug member snugly and slidably received within said cap, the end wall in said cap including means to center the axis of the plug member relative to the axis of the cap, said plug member comprising a generally cylindrical body portion complementary with the cylindrical cavity in the cap, the plug body portion having at one end portion thereof a radially extending surface generally complementary with the sealing face of the mating member, the other end of the plug body portion terminating in a surface generally complementary with the end wall within the cap member, said radially extending surface of said plug being interrupted and forming a sealing cavity concentric with the body portion of said plug and being opposed to the sealing face of the mating member when the end closure assembly is operatively connected with the mating member, sealing means received within the sealing cavity and, in the undeformed state, extending axially slightly beyond said radially extending surface of the plug, thereby providing adequate seal compression and effecting a proper fluid seal between the sealing face of the mating member and the radially extending surface of the plug when the end closure assembly is operatively associated with the mating member, the said plug member being of polytetrafluoroethylene.

7. An end closure assembly for a threaded mating member having an axial fluid passageway therein, said member having a radial end sealing face transverse the axis of the passageway, such assembly comprising a cap member having an axially disposed, generally cylindrical cavity terminating internally of the cap with a closed end wall, the open end of said cap having thread means concentric with the axial cavity adapted to co-operate with the threads of the mating member, the cap having means for advancing the cap along the threads of the mating member, said assembly further comprising a plug member snugly and slidably received within said cap, the end wall in said cap including means to center the axis of the plug member relative to the axis of the cap, said plug member comprising a generally cylindrical body portion complementary with the cylindrical cavity in the cap, the plug body portion having at one end portion thereof a radially extending surface generally complementary with the sealing face of the mating member, the other end of the plug body portion terminating in a surface generally complementary with the end wall within the cap member, said radially extending surface of said plug being interrupted and forming a sealing cavity concentric with the body portion of said plug and being opposed to the sealing face of the mating member when the end closure assembly is operatively connected with the mating member, sealing means received within the sealing cavity and, in the undeformed state, extending axially slightly beyond said radially extending surface of the plug, thereby providing adequate seal compression and effecting a proper fluid seal between the sealing face of the mating member and the radially extending surface of the plug when the end closure assembly is operatively associated with the mating member, the end wall in the cap member and the complementary surface of the plug being generally conical.

References Cited by the Examiner
UNITED STATES PATENTS

| | | | |
|---|---|---|---|
| 1,645,046 | 10/1927 | Gallagher | 220—39 |
| 1,748,665 | 2/1930 | Woods | 220—39 |

THERON E. CONDON, *Primary Examiner.*

J. B. MARBERT, *Assistant Examiner.*